United States Patent [19]

Itoh et al.

[11] Patent Number: 5,711,612
[45] Date of Patent: Jan. 27, 1998

[54] DYNAMIC PRESSURE BEARING

[75] Inventors: Masao Itoh; Toyotsugu Itoh; Yoshio Iwamura, all of Hachioji, Japan

[73] Assignee: Konica Corporation, Japan

[21] Appl. No.: 540,080

[22] Filed: Oct. 6, 1995

[30] Foreign Application Priority Data

Oct. 14, 1994 [JP] Japan .................................. 6-249730

[51] Int. Cl.$^6$ ............................................. F16C 17/10
[52] U.S. Cl. ..................................... 384/107; 384/121
[58] Field of Search ............................. 384/112, 113, 384/107, 115, 123, 114, 121

[56] References Cited

U.S. PATENT DOCUMENTS 5,141,338  8/1992  Asada et al. ........................ 384/114
5,472,283  12/1995  Takahashi et al. .................. 384/100
5,538,347  7/1996  Itoh et al. .......................... 384/107

*Primary Examiner*—Lenard A. Footland
*Attorney, Agent, or Firm*—Jordan B. Bierman; Bierman, Muserlian and Lucas

[57] ABSTRACT

In a dynamic pressure bearing, a dynamic pressure-generating groove is provided to one of a thrust bearing surface and a part of a rotator facing the thrust bearing surface on one of a first and second thrust bearings, and a thrust bearing surface and a part of the rotator on the other one of the first and second thrust bearings which is not provided with the dynamic pressure-generating groove are smoothed so that the smoothed surfaces are formed.

7 Claims, 4 Drawing Sheets

Ra LARG         $d_1 > d_2$         Ra SMALL

DYNAMIC PRESSURE BEARING

BACKGROUND OF THE INVENTION

The present invention relates to a dynamic pressure bearing of a rotating machine in which an air gap is formed between a rotator and a stator which is not rotated and the rotator can be rotated at a high speed by an uniform air layer formed in the air gap by the rotation of the rotator.

In a conventional dynamic pressure bearing, an air current generated by a high speed rotation of a rotator is introduced to a dynamic pressure-generating groove provided on either the rotator or a stator, whereby the dynamic pressure-generating groove blows a strong wind pressure onto the surfaces of the rotator and the stator. As a result, an air gap of several μm in thickness is formed between the rotator and the stator. A technique to make it possible to rotate smoothly the rotator at a high speed by reducing a resistance between the rotator and the stator with the air gap is disclosed in Japanese Patent Application Open To Public Nos. 63-87162 and 63-173014. A light deflecting apparatus with a polygonal mirror uses a dynamic pressure bearing in which a rotator as mentioned above is floated with an air gap of several μm in thickness by the work of a dynamic pressure-generating groove provided on a fixed radial bearing and a fixed thrust bearing and then is rotated at a high speed not lower than 3000 rpm.

In a conventional dynamic pressure bearing, as shown in FIG. 4, a rotation-supporting device 1 for a polygonal mirror is provided with a dynamic bearing 11 which comprises a plate-like thrust bearings 2, 3 on its upper and lower portions and a pillar-like radial bearing 4 fixed between the thrust bearings 2, 3. Dynamic pressure-generating grooves 22, 32, 42 are formed on the bearing surfaces 21, 31 of the thrust bearings 2, 3 and the bearing surface 41 of the radial bearing 4 respectively. A rotator 5 is arranged so as to have its rotation axis in the radial bearing 4 and to form supported surfaces 51, 52, 53 which are rotatable with regard to the bearing surfaces 21, 31, 41. A polygonal mirror 7 is fixed on an attaching member 6 which is integrally formed on the outer periphery of the rotator 5 as a single unit. On the lower portion of the attaching member 6 is provided a magnet 6A which is shaped in a ring or separated into several pieces in the rotation direction, and on the rotation-supporting device 1 is provided the stator coil 8 so as to locate opposite to the magnet 6A. The magnet 6A and stator coil 8 are constructed in such a manner that a high rotation of the rotator 5 is induced when the stator coil 8 is activated. With the thus induced rotation, a very thin air gap of 1 μm to 7 μm is formed between the bearing surfaces 21, 31 of the thrust bearings and the supported surfaces 51, 52 of the rotator 5 and between the bearing surface 41 of the radial bearing 4 and the supported surface 53 of the rotator 5, whereby the rotator can be rotated at a high speed.

In the above mentioned dynamic pressure bearing, for the rotating surfaces of the rotator 5, the dynamic pressure-generating grooves 22, 32, 42 are formed on the bearing surfaces of the radial bearing 4 and the thrust bearings 2, 3 respectively. In order to form the very thin air gap, the dynamic pressure-generating grooves 22, 32, 42 are to be a shallow groove of several μm in depth which is required to a high precision processing. In the case that all or some of the rotator 5, the thrust bearings 2, 3, and the radial bearing 4 are made of a hard ceramic material, the processing to make the dynamic pressure-generating groove is required a special processing technique and needs a long processing time. As a result, a cost for parts of the bearing becomes very expensive.

On the other hand, in the case that the dynamic pressure-generating groove is provided on one side of the thrust bearings, there is a fear that the rotator may contact with the bearing. Further, since the a force works in one direction onto the rotator, there is a fear that a rotating attitude of the rotator becomes unstable.

SUMMARY OF THE INVENTION

The present invention has been conceived in order to improve above mentioned drawbacks. That is, in a dynamic pressure bearing constructed by a rotator, a radial bearing and thrust bearings, an air gap is formed by the enhancement of the true roundness (deviation from circularity) and the surface roughness with a high precision treatment on a radial bearing surface which dose not receive the weight of the rotator and a magnetic force of a magnet and on an upper thrust bearing surface, and a dynamic pressure-generating groove is provided only on a lower thrust bearing surface which receives the weight of the rotator, whereby an object of the present invention is to reduce a number of the dynamic pressure-generating grooves which needs a high degree processing-technique and to provide a low price dynamic pressure bearing.

The above object can be achieved by the following structure. In a dynamic pressure bearing comprising a rotator, a radial bearing to regulate a rotation axis of the rotator, and a first and second thrust bearings disposed so as to sandwich the rotator therebetween so that a movement of the rotator in the axial direction is regulated by the first and second thrust bearings, a dynamic pressure-generating groove is provided to one of a bearing surface and a part of the rotator on one of the first and second thrust bearings and a bearing surface and a part of the rotator on the other one of the first and second thrust bearings which is not provided with the dynamic pressure-generating groove are smoothed so that the smoothed surfaces are formed.

The smoothed surface has a roughness not greater than 0.5 μm.

The first and second bearings are disposed on an upper portion and lower portion of the radial bearing and the dynamic pressure-generating groove is provided on the thrust bearing disposed on the lower portion. The smoothed surfaces are formed on both of the first and second thrust bearings.

The true roundness of the surfaces facing each other between the radial bearing and the rotator is not greater than 5 μm.

In a dynamic pressure bearing comprising a radial bearing, thrust bearings disposed on both upper and lower ends of the radial bearing, and a rotator supported rotatably by the radial bearing and the thrust bearings, a bearing surface of the radial bearing facing a part of the rotator and a bearing surface of the upper thrust bearing are smoothed so that smoothed surfaces are formed, and one of a bearing surface of the lower thrust bearing and a part of the rotator facing each other is provided with a dynamic pressure-generating groove.

DETAILED DESCRIPTION OF THE PREFERRED EMBODIMENT

Figure 1:
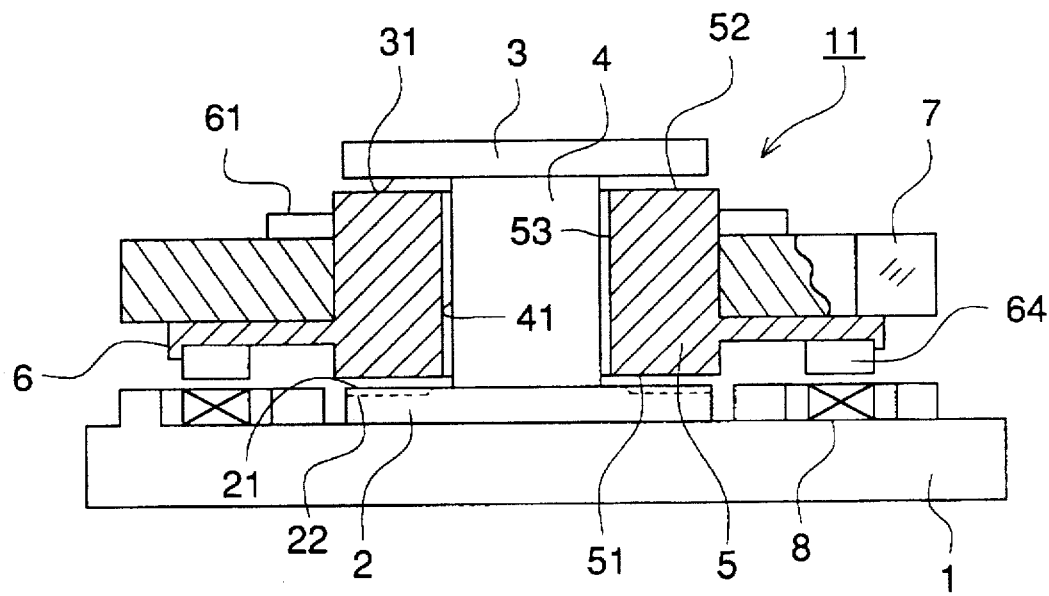
FIG. 1 is a sectional view showing a light deflecting apparatus in which a dynamic pressure bearing of the present invention is used.

FIG. 1 is an apparatus in which a dynamic pressure bearing is used in a light-deflecting device. A reference number 1 represents a rotation-supporting device for a polygonal mirror. On an upper portion and a lower portion of the rotation-supporting device are provided an upper thrust bearing 3 and a lower thrust bearing 2 which are made of a low thermal expansion coefficient material, such as a ceramic. A column-shaped radial bearing 4 is integrally fixed between the upper thrust bearing 3 and the lower thrust bearing 4 as a single unit. Bearing surfaces 21, 31 of the thrust bearings 2, 3 are applied with a high precision surface treatment so that the bearing surfaces 21, 31 have a surface roughness (hereinafter refer to Ra) not greater than 0.5 μm. Any conventional method of high precision surface treatment may be used as the surface treatment in this embodiment. For measuring Ra, for example, a device of SARFU COADER SE-30H (manufactured by Kosaka Kenkyusho), may be used. Bearing surface 41 of the radial bearing 4 is also applied with the high precision surface treatment so that the bearing surface 41 has a true roundness with a deviation not greater than 5 μm between the maximum diameter and the minimum diameter. As a processing method for the bearing surface 41, for example, a grinding treatment with a rotating grinder may be used. For measuring the true roundness, a high precision type true roundness measuring device EC-10D (manufactured by Kosaka Kenkyusho) may be used. On the bearing surface 21 of the lower thrust bearing 2, a dynamic pressure-generating groove 22 is provided.

A rotator 5 made of a low thermal expansion coefficient material such as a ceramic is supported by the bearing surface 41 of the radial bearing 4 so that the rotator 5 has its rotation axis in the radial bearing 4. The rotator 5 forms supported surfaces 51, 52, 53 so as to face the bearing surfaces 21, 31, 41 respectively. The supported surfaces 51, 52, 53 of the rotator 5 are applied with the similar surface treatment of the bearing surfaces 21, 31, 41 so that the surfaces 51, 52, 53 have the roughness Ra not greater than 0.5 μm. The supported surface 53 facing the bearing surface 41 of the radial bearing 4 is also applied with the similar precision treatment of the bearing surface 41 so that the supported surface has a true roundness having a deviation not greater than 5 μm. With regard to the treating method and the measuring method, the above mentioned devices may be used.

A polygonal mirror 7 is fixed with a fixing member 61 onto an attaching member 6 formed integrally onto the outer periphery of the rotator 5. Along the rotation direction on the lower portions of the rotator is provided a plurality of magnets 64 or a round-shaped magnet 64. On the rotation-supporting device is provided a stator coil 8 so as to locate opposite to the magnet 64, whereby a high rotation speed of the rotator 5 is induced when the electrical circuit of the stator coil 8 is activated.

Figure 5:
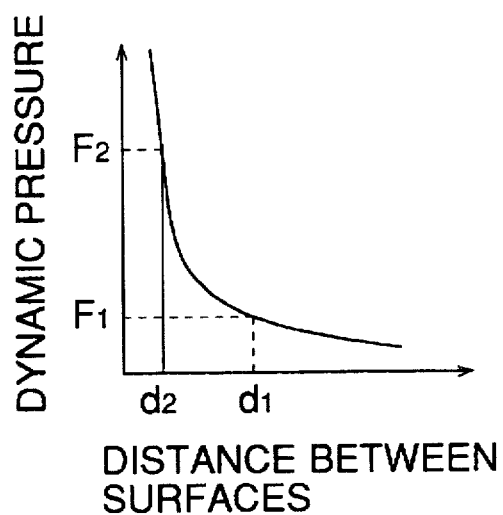
FIG. 5 is a diagram showing a relation between dynamic pressure and distance between surfaces.
Figure 6:
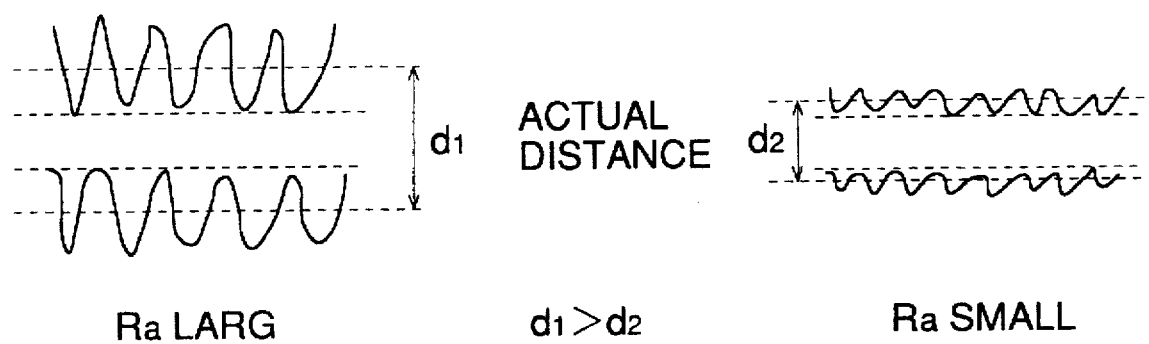
FIG. 6 is an illustration showing an actual distance.

In the dynamic pressure bearing 11 constructed as mentioned above, a rotation force is induced on the magnets 64 provided on the rotator 5 so that the rotator 5 and the polygonal mirror 7 are rotated at a high speed. At this time, the supported surface 51 of the rotator 5 receives the dynamic pressure generated by the dynamic pressure-generating groove 22 formed on the bearing surface 21 of the lower thrust bearing 2. Accordingly, as the rotation speed of the rotator increases, the rotator is floated in spite of the weight of both the rotator 5 and the polygon mirror 7 and a gap of 1 to 7 μm is formed between the supported surface 51 and the bearing surface 21. Further, with the high rotation speed, a gap of 2 to 20 μm is formed between the supported surface 52 of the rotator 5 and the bearing surface 31 of the upper thrust bearing 3 and between the supported surface 53 of the rotator 5 and the bearing surface 41 of the radial bearing 4 by the dynamic pressure. With the bearing surface of the thrust bearing applied with the surface treatment as mentioned above, the dynamic pressure is generated between the bearing surface of the bearing and the supported surface of the rotator because of the following reasons. As shown in FIG. 5, when one of two surfaces which are opposite to each other is rotated at a high speed, the smaller the distance between the opposite surfaces is, the higher the generated dynamic pressure is. As shown in FIG. 6, if the surface roughness of the opposite surfaces could be made smaller, the distance between the opposite surfaces could be made substantially smaller. Therefore, if the surface roughness between the opposite surfaces is made smaller so as to form a smoothed surface, the higher dynamic pressure can be generated. Accordingly, the rotator 5 and the polygonal mirror 7 are floated by the work of the dynamic pressure generating-groove 22, and the high dynamic pressure is generated on the upper thrust bearing by the smoothed surface even if the upper thrust bearing is not provided with a dynamic pressure-generating groove. As a result, the rotator can be rotated smoothly at a high speed between the lower thrust bearing and the upper thrust bearing, keeping a balance on a stable condition without contacting the bearing surfaces. In this embodiment, the above object can be accomplished by the surface roughness not greater than 0.5 μm. Consequently, the rotator 5 and the polygonal mirror 7 can be rotated smoothly at a high speed with the gap created by the floating with the work of the dynamic pressure-generating groove.

Figure 2:
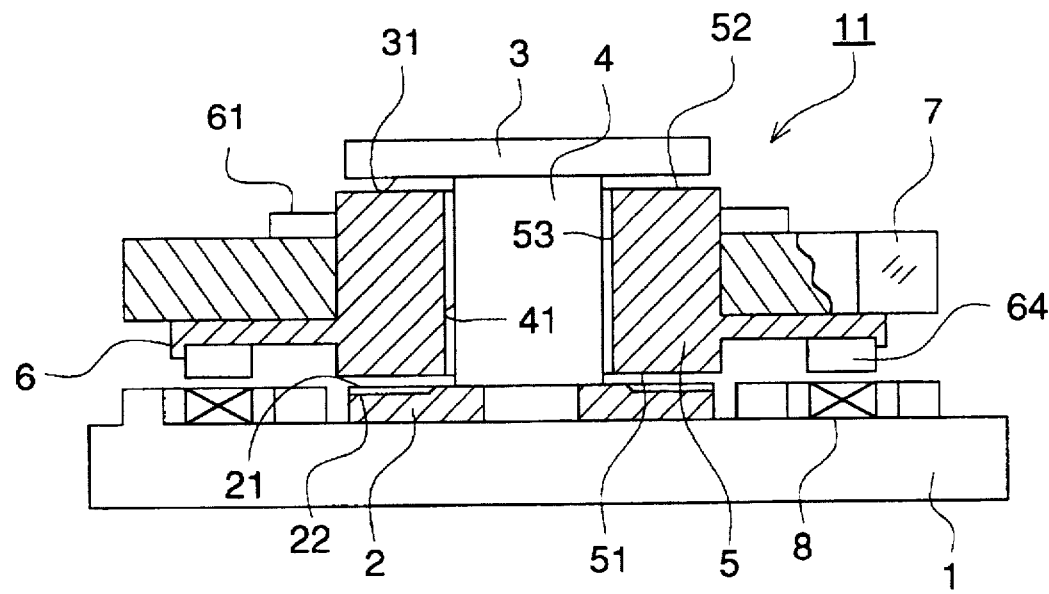
FIG. 2 is a sectional view showing a light deflecting apparatus in which another example of the dynamic pressure bearing of the present invention is used.

FIG. 2 is an apparatus in which a dynamic pressure bearing is used in a light-deflecting device, likewise with FIG. 1. A reference number 1 represents a rotation-supporting device for a polygonal mirror. On an upper portion and a lower portion of the rotation-supporting device are provided an upper thrust bearing 3 and a lower thrust bearing 2 which are made of a low thermal expansion coefficient material, such as a ceramic. A column-shaped radial bearing 4 is integrally fixed between the upper thrust bearing 3 and the lower thrust bearing 4 as a single unit. Bearing surface 31 of the thrust bearings 2, 3 are applied with a high precision surface treatment so that the bearing surface 31 have a surface roughness Ra not greater than 0.5 μm. Bearing surface 41 of the radial bearing 4 is also applied with the high precision surface treatment as mentioned above so that the bearing surface 41 has a true roundness with a deviation not greater than 5 μm. On the bearing surface 21 of the lower thrust bearing 2, a dynamic pressure-generating groove 22 is provided.

In this embodiment, firstly, the upper thrust bearing and the radial bearing are integrally formed in a single unit. Then, the lower thrust bearing on which the dynamic pressure generating groove 22 is provided is formed as a separate unit from the radial bearing 4, and an attaching hole formed on the lower thrust bearing 2 is fixed in engagement with an attaching shaft 42 provided integrally to the radial bearing 4. With this construction, the bearing surface 31 of the upper thrust bearing 3 and bearing surface 41 of the radial bearing 4 can be applied with a more precise cutting process and a more precise polishing process. The cutting process and the polishing process can be conducted in the similar manner mentioned above. Further, the processing for the dynamic pressure-generating groove on the bearing surface 21 of the lower thrust bearing 2 can be conducted more simply.

Figure 3:
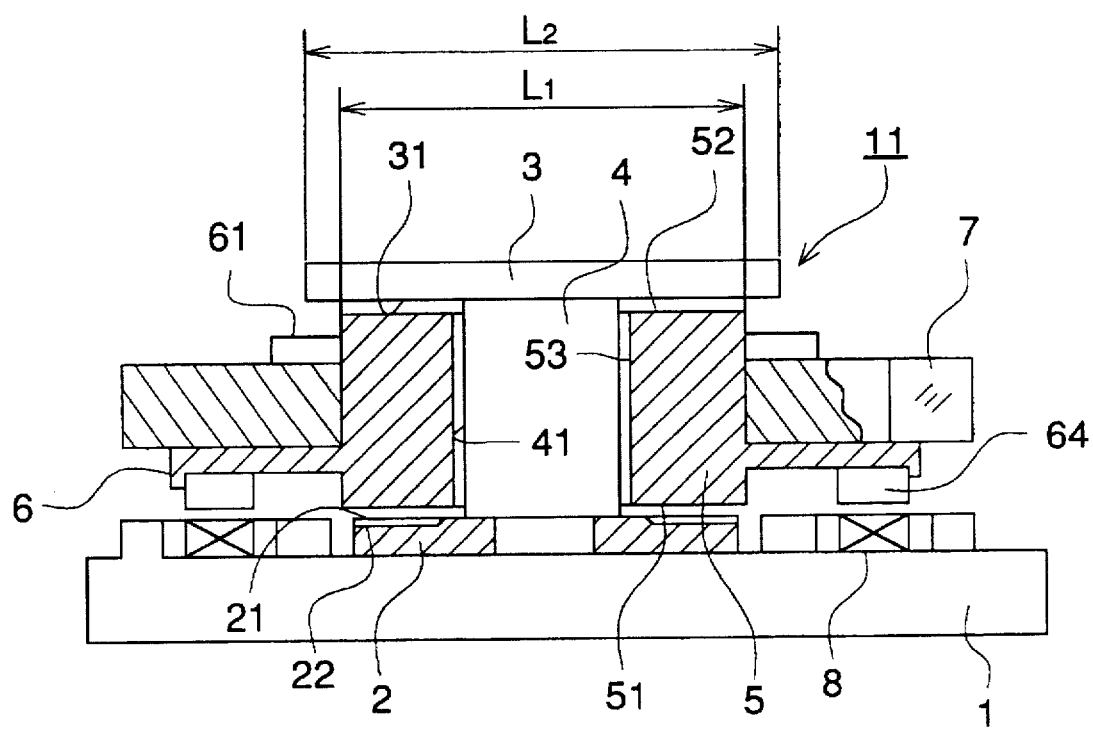
FIG. 3 is a sectional view showing a light deflecting apparatus in which another example of the dynamic pressure bearing of the present invention is used.
Figure 4:
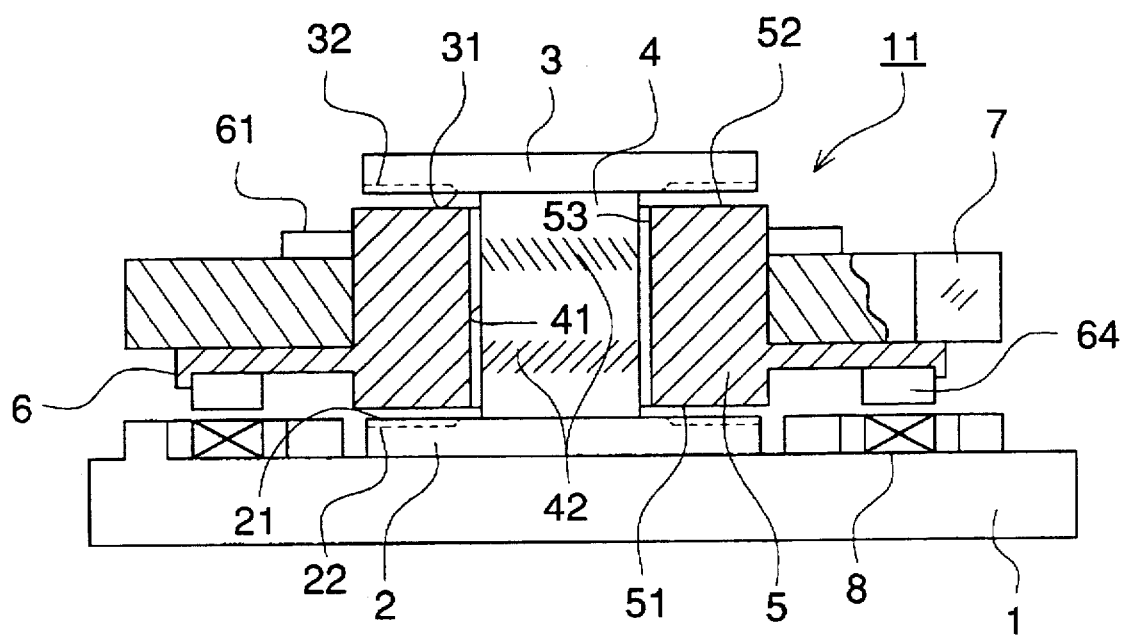
FIG. 4 is a sectional view showing a light deflecting apparatus in which a conventional dynamic pressure bearing is used.

FIG. 3 is an apparatus in which a dynamic pressure bearing is used in a light-deflecting device, likewise with FIGS. 1 and 2. A reference number 1 represents a rotation-supporting device for a polygonal mirror. On an upper portion and a lower portion of the rotation-supporting device are provided an upper thrust bearing 3 and a lower thrust bearing 2 which are made of a low thermal expansion coefficient material, such as a ceramic. A column-shaped radial bearing 4 is integrally fixed between the upper thrust bearing 3 and the lower thrust bearing 2 as a single unit. Bearing surfaces 21, 31 of the thrust bearings 2, 3 are applied with a high precision surface treatment so that the bearing surfaces 21, 31 have a surface roughness Ra not greater than 0.5 μm. Bearing surface 41 of the radial bearing 4 is also applied with the high precision surface treatment as mentioned above so that the bearing surface 41 has a true roundness with a deviation not greater than 5 μm. On the bearing surface 21 of the lower thrust bearing 2, a dynamic pressure-generating groove 22 is provided.

In this embodiment, also, the upper thrust bearing and the radial bearing are integrally formed in a single unit. Then, the lower thrust bearing on which the dynamic pressure generating groove 22 is provided is formed as a separate unit from the radial bearing 4, and an attaching hole formed on the lower thrust bearing 2 is fixed in engagement with an attaching shaft 42 provided integrally to the radial bearing 4. With this construction, the bearing surface 31 of the upper thrust bearing 3 and bearing surface 41 of the radial bearing 4 can be applied with a more precise cutting process and a more precise polishing process. The cutting process and the polishing process can be conducted in the similar manner mentioned above. Further, the processing for the dynamic pressure-generating groove on the bearing surface 21 of the lower thrust bearing 2 can be conducted more simply. Furthermore, in this embodiment, the relation between the outer diameter L2 of the upper thrust bearing 3 and the outer diameter L1 of the rotator 5 is constituted so as to satisfy the following inequality: L2>L1, whereby dynamic air pressure generated between the supported surface 52 of the rotator 5 and the bearing surface 31 of the upper thrust bearing 3 and between the supported surface 53 of the rotator 5 and the bearing surface 41 of the radial bearing 4 by the high speed rotation of the rotator 5 is blocked so as not to leak to the outside by the bearing surface 3 of the upper thrust bearing 3, thereby keeping stably the dynamic pressure condition.

Incidentally, in FIGS. 2 and 3, the rotator 5 and the polygonal mirror 7 can be smoothly rotated at a high speed with the air gap on a floating condition by the high speed rotation of the rotator 5, similarly with FIG. 1.

Further, in accordance with a requirement, it may be possible to make the rotator 5, the radial bearing 4, the upper thrust bearing 3 and the lower thrust bearing from a resin material.

As mentioned above, in the dynamic pressure bearing of the present invention in which the rotator is rotatably supported by the radial bearing which supports the rotation shaft of the rotator, an upper thrust bearing and a lower thrust bearing, a dynamic pressure-generating groove is formed on the bearing surface of the lower thrust bearing, and the bearing surfaces of the radial bearing and the upper thrust bearing and the supported surface of the rotator are applied with the high precision surface treatment or polishing instead of the dynamic pressure-generating groove, thereby obtaining the dynamic pressure action. As a result, a number of processes to make the dynamic pressure-generating groove can be reduced to a great extent on comparison with the conventional dynamic pressure bearing. Consequently, the dynamic pressure bearing of the present invention can be manufactured easily at a low cost.

What is claimed is:

1. A dynamic pressure bearing comprising a rotator having a vertical rotation axis;

a radial bearing having a radial bearing surface supporting said vertical rotation axis;

a first thrust bearing having a first bearing surface, a first part of said rotator riding on said first bearing surface so that said first bearing surface supports said rotator;

a dynamic pressure-generating groove on at least one of said first bearing surface and said first part of said rotator whereby a first dynamic pressure is generated between said first bearing surface and said first part when said rotator is rotated and floated upward by said first dynamic pressure;

a second thrust bearing having a second bearing surface, a second part of said rotator located beneath said second bearing surface, both of said second bearing surface and said second part having no dynamic pressure-generating grooves and having smoothed surfaces.

2. The dynamic pressure bearing of claim 1 wherein said smoothed surfaces have roughnesses not exceeding 0.5 μm, whereby a second dynamic pressure is generated between said smoothed surfaces when said rotator is rotated and upward movement of said rotator is controlled by said second dynamic pressure.

3. The dynamic pressure bearing of claim 1 wherein said second thrust bearing is located above said first thrust bearing.

4. The dynamic pressure bearing of claim 1, wherein the smoothed surfaces are formed on both of the first and second thrust bearings.

5. The dynamic pressure bearing of claim 1, wherein the surfaces facing each other between the radial bearing and the rotator have a true roundness with a deviation not greater than 5 μm.

6. The dynamic pressure bearing of claim 1 wherein said second surface is constructed separately from said radial bearing.

7. The dynamic pressure bearing of claim 1 wherein said second thrust bearing has an outer diameter L2 and said first thrust bearing and said rotator have an outer diameter L1, L2 being greater than L1.

* * * * *